United States Patent
Singhal (10) Patent No.: US 10,372,711 B2
(45) Date of Patent: Aug. 6, 2019

(54) SYSTEM AND METHOD PREDICTING EFFECT OF CACHE ON QUERY ELAPSED RESPONSE TIME DURING APPLICATION DEVELOPMENT STAGE

(71) Applicant: Tata Consultancy Services Limited, Mumbai, Maharashtra (IN)

(72) Inventor: Rekha Singhal, Maharashtra (IN)

(73) Assignee: TATA CONSULTANCY SERVICES LIMITED, Mumbai, Maharashstra (IN)

(*) Notice: Subject to any disclaimer, the term of this patent is extended or adjusted under 35 U.S.C. 154(b) by 593 days.

(21) Appl. No.: 14/566,276

(22) Filed: Dec. 10, 2014

(65) Prior Publication Data
US 2015/0178277 A1 Jun. 25, 2015

(30) Foreign Application Priority Data
Dec. 23, 2013 (IN) .......................... 4016/MUM/2013

(51) Int. Cl.
*G06F 16/00* (2019.01)
*G06F 16/2455* (2019.01)
*G06F 16/35* (2019.01)
*G06F 16/957* (2019.01)

(52) U.S. Cl.
CPC ........ *G06F 16/24552* (2019.01); *G06F 16/35* (2019.01); *G06F 16/9577* (2019.01)

(58) Field of Classification Search
CPC ................................................. G06F 17/3048
USPC ........................................................ 706/20
See application file for complete search history.

(56) References Cited

U.S. PATENT DOCUMENTS

| 5,305,389 | A  | * | 4/1994  | Palmer ................ G06F 12/0862 382/100 |
| 6,711,562 | B1 | * | 3/2004  | Ross ................. G06F 17/30327 707/741 |
| 6,944,711 | B2 |   | 9/2005  | Mogi et al. |
| 6,952,664 | B1 |   | 10/2005 | Lahiri et al. |
| 7,139,872 | B1 | * | 11/2006 | Bachmat ............. G06F 11/3447 711/113 |
| 7,512,591 | B2 |   | 3/2009  | Bildhaeuser et al. |
| 8,332,586 | B2 |   | 12/2012 | Takada |
| 2002/0062415 | A1 | * | 5/2002 | Wang .................. G06F 13/1605 710/240 |

(Continued)

OTHER PUBLICATIONS

Singhal et al, "Extrapolation of SQL QUery Elapsed Response Time at Application Development Stage", 2012 Annual IEEE India Conference, Dec. 7-9, 2012, p. 35-41.*

(Continued)

*Primary Examiner* — Li B. Zhen
*Assistant Examiner* — Tsu-Chang Lee
(74) *Attorney, Agent, or Firm* — Thompson Hine LLP (57) ABSTRACT

System(s) and method(s) for predicting effect of database cache on query elapsed response time during an application development stage are disclosed. Query executed on a database is classified and a query type is obtained. Database statistics are collected to further determine one or more cache miss factors with respect to the query type. One or more time components are calculated due to the one or more cache miss factors with respect to the query type. The one or more time components are used to predict the query elapsed response time for varying size of the database.

9 Claims, 7 Drawing Sheets

(56) References Cited

U.S. PATENT DOCUMENTS

2006/0074970 A1* 4/2006 Narayanan .......... G06F 11/3419
2010/0100604 A1 4/2010 Fujiwara et al.

OTHER PUBLICATIONS

Singhal, et al., "A Framework for Predicting Query Response Time", 2012 IEEE 14the International Conference on High Performance Computing and Communications.*
Jingren Zhou, Kenneth A. Ross; "Buffering Accesses to Memory-Resident Index Structures"; Columbia University 2003.
Jingren Zhou and Kenneth A. Ross; "Buffering Database Operations for Enhanced Instruction Cache Performance"; Columbia University 2004.
Amitayu Das, Ritendra Datta, Anand Sivasubramaniam and Bhuvan Urgaonkar; "Predicting Web Cache Behavior using Stochastic State-Space Models"; Dept. of CSE, The Pennsylvania State University, University Park, PA 16802, 2006.
Rekha Singhal; "A Measurement based Model to Predict Query 10 Access Time with Data Growth"; Computer Measurement Group, India, Oct. 2013.
Jingren Zhou; "Architecture-Sensitive Database Query Processing"; Columbia University 2004.

* cited by examiner

SYSTEM AND METHOD PREDICTING EFFECT OF CACHE ON QUERY ELAPSED RESPONSE TIME DURING APPLICATION DEVELOPMENT STAGE

CROSS-REFERENCE TO RELATED APPLICATIONS AND PRIORITY

The present application claims priority from the Indian patent application number 4016/MUM/2013 filed on 23 Dec. 2013.

TECHNICAL FIELD

The present disclosure in general relates to a method and system for predicting effect of cache. More particularly, the present disclosure relates to prediction of effect of cache on query elapsed response time during an application development stage.

BACKGROUND

While dealing with query execution and analysis, optimization procedures are usually followed to predict performance of query with respect to a particular system or database. In order to clearly predict the performance of query in advance, growth or variation of database with time should be considered. The varying size of database may drastically affect the query performance time.

There are so many factors associated with the database that may affect the query response. Such factors may include access pattern of the query. Most of the existing technology methods predict the query response time on a system based on the past history of the executed queries on the database system or by using Machine Learning (ML) approach. Such approaches may differ in applying different ML techniques and also these approaches are not suitable at an application development stage. Also, use of past queries may increase error possibility.

Further, in some of the proposed solutions, changes in the Database (DB) server internals is required which may not be a feasible option. Although, some of the solutions have made use of database cost utility only to understand the query access plan on large size database. However, little thought has been given to dealing with increase in data volume while checking the query performance.

SUMMARY OF THE INVENTION

This summary is provided to introduce aspects related to system(s) and method(s) for designing a network for one or more entities forming an enterprise network and the aspects are further described below in the detailed description. This summary is not intended to identify essential features of the claimed subject matter nor is it intended for use in determining or limiting the scope of the claimed subject matter.

The present disclosure relates to a system predicting effect of cache on query elapsed response time during an application development stage. The system comprises of a processor and a memory coupled to the processor. The processor is capable of executing a plurality of modules stored in the memory. The plurality of module comprises of a classification module configured to classify a query executed on a database to obtain a query type, wherein the query is classified based on a database access pattern of the query along with a relation between one or more keys associated with the query and a determination module. The determination module is configured to collect one or more database statistics with respect to the query type, wherein the database statistics refers to a data distribution in the database and the data access pattern of the query inside the database and determine one or more cache miss factors by using the database statistics, wherein the one or more cache miss factors predicts access of the cache by the query. The plurality of modules further comprises of a calculation module configured to calculate one or more time related value associated with processing of the query in the database with respect to the one or more cache miss factors and a prediction module configured to predict the query elapsed response time by using the one or more time related values for varying size of the database.

The present disclosure also relates to a method predicting effect of cache on query elapsed response time during an application development stage. The method comprises of classifying a query executed on a database to obtain a query type, wherein the query is classified based on a database access pattern of the query along with a relation between one or more keys associated with the query, collecting one or more database statistics with respect to the query type, wherein the database statistics refers to a data distribution in the database and the data access pattern of the query inside the database and determining one or more cache miss factors by using the database statistics, wherein the one or more cache miss factors predicts access of the cache by the query. The method further comprises of calculating one or more time related value associated with processing of the query in the database with respect to the one or more cache miss factors and predicting the query elapsed response time by using the one or more time related values for varying size of the database.

The present disclosure also relates to a computer program product having embodied thereon a computer program predicting effect of cache on query elapsed response time during an application development stage. The computer program product comprises of a program code for classifying a query executed on a database to obtain a query type, wherein the query is classified based on a database access pattern of the query along with a relation between one or more keys associated with the query, a program code for collecting one or more database statistics with respect to the query type, wherein the database statistics refers to a data distribution in the database and the data access pattern of the query inside the database and a program code for determining one or more cache miss factors by using the database statistics, wherein the one or more cache miss factors predicts access of the cache by the query. The computer program product further comprises of a program code for calculating one or more time related value associated with processing of the query in the database with respect to the one or more cache miss factors and a program code for predicting the query elapsed response time by using the one or more time related values for varying size of the database.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer to like features and components.

DETAILED DESCRIPTION

While aspects of described systems and methods to predicting effect of cache on query elapsed response time during an application development stage may be implemented in any number of different computing systems, environments, and/or configurations, the embodiments are described in the context of the following exemplary system.

Figure 1:
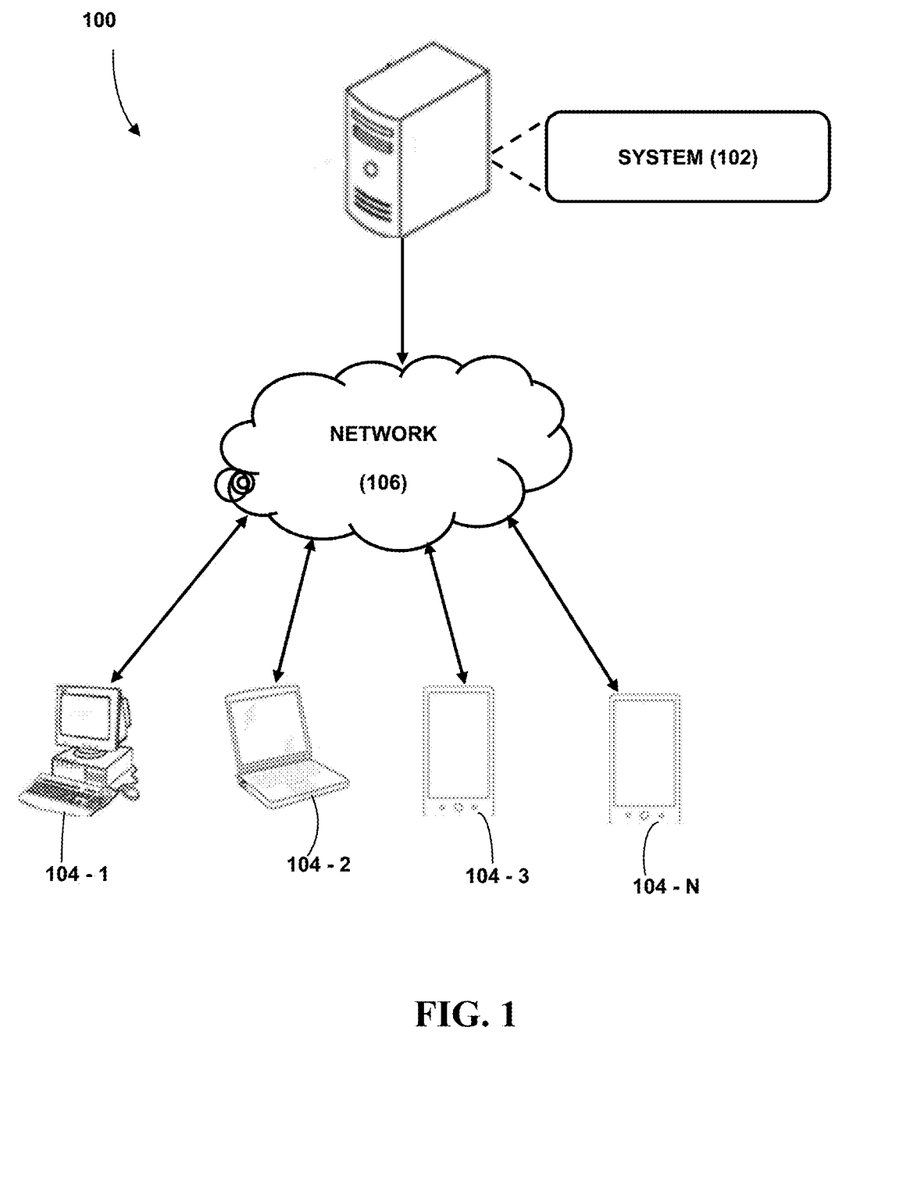
FIG. 1 illustrates a network implementation of a system predicting effect of cache on query elapsed response time during an application development stage, in accordance with an embodiment of the present subject matter.

Referring now to FIG. 1, a network implementation 100 of system 102 predicting effect of cache on query elapsed response time during an application development stage enterprise is shown. A query executed on a database is classified based on a database access pattern of the query to obtain a query type. Database statistics is collected with respect to the query type and is used to determine cache miss factors. One or more time related values are calculated due to cache miss factors for the query type. The query elapsed response time is predicted by summing one or more time related values.

Although the present subject matter is explained considering that the system 102 is implemented as an application on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2, 104-3, . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like.

The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
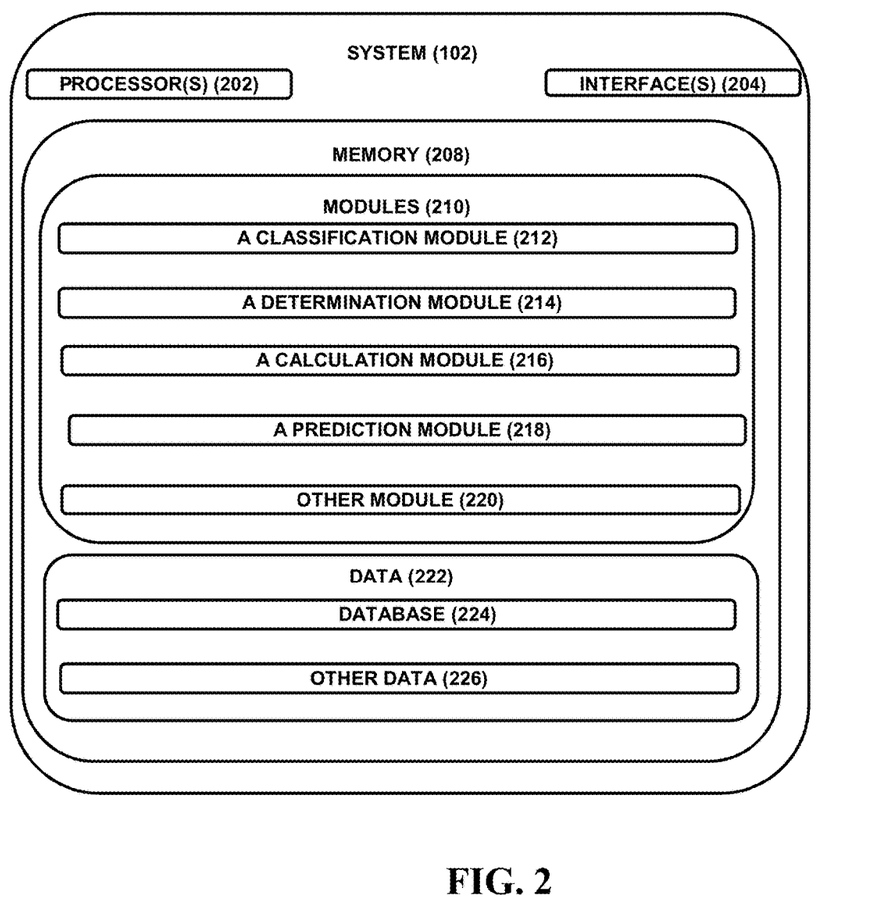
FIG. 2 illustrates the system predicting effect of cache on query elapsed response time during an application development stage, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, a memory 208. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 208.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 208 may include modules 210 and data 222.

The modules 210 include routines, programs, objects, components, data structures, etc., which perform particular tasks, functions or implement particular abstract data types. In one implementation, the modules 210 may include a classification module 212, a determination module 214, a calculation module 216, and a prediction module 218. Other modules 220 may include programs or coded instructions that supplement applications and functions of the system 102.

The data 222, amongst other things, serves as a repository for storing data processed, received, and generated by one or more of the modules 210. The data 222 may also include a database 224, and other data 226. The other data 226 may include data generated as a result of the execution of one or more modules in the other module 220.

The present disclosure relates to a system(s) and method(s) predicting effect of cache on query elapsed response time. Query is executed on a database particularly database of small size. All the observations are carried out over the database of small size so that prediction could be done for a database at a development stage. This helps in making analysis while developing a production database. Lot of factors are involved in affecting query response time thus contributing in query elapsed response time. The execution of query over the database of small size helps in observing the lot of factors affecting the query retrieval time. One such factor is cache. In case of repeated access of database by the query, cache factors affects the query elapsed response time.

Before discussing various embodiments associated with the present disclosure, notations used for explaining the system and method are listed in Table 1 and will be used throughout the document to explain various embodiments of the present disclosure.

TABLE 1

| Variable Name | Meaning |
|---|---|
| TotBlks | Total number of blocks in the table |
| NRB | Number of records/rows in a block |
| Maxval | Maximum unique values the corresponding primary key can have |
| DKV | Number of data blocks per key value |
| MatchKeys | Number of keys matching the predicate |
| SeqSegs | Number of sequential segments of index values in a block |
| ECD | Cache for data blocks |
| Prob(Miss/ block/key) | Probability that an access for a value of key in a block is not in DB cache |
| Prob(RowsBlk) | Probability that a row of a key value is in the block |

The classification module 212 classifies a query executed on a database of small size to identify a query type. The query type comprises of a non unique index scan query. The non unique index scan query is a query that may access multiple data blocks for a key value. The behavior of cache access by the query (here non unique index scan query) depends on the data value distribution (or data distribution pattern) and data access pattern (which determines the order of key values which are used to access the data). Data access follows pattern of UR and SUR distribution. Data access pattern may be named as UR access pattern and SUR access patter. Repeated accesses may be serviced either from Operating System (OS) cache or Database (DB) cache depending on data access and data distribution in the table present in the database.

The determination module 214 is configured to collect database statistics with respect to the query type. The database statistics refer to data distribution type or pattern and data access pattern associated with the processing of the query type in the database. In the present scenario, the determination module 214 collects data distribution pattern inside the database and database access pattern (collectively called as database statistics) for the non unique index scan query.

There are two levels of main memory cache contributing to one or more calculation of one or more cache miss factors. For the purpose of simplicity we will call database cache miss factors as simply cache misses or database cache misses.

The levels of main memory comprises of Database (DB) cache and Operating System (OS) cache. OS does prefetching while accessing a block; therefore, subsequent accesses to the sequential blocks get serviced from the OS cache. Once database access a block, it is stored in its DB cache, therefore any access to the same block before it is evicted will be serviced from the DB cache.

The query is executed over the database of small size. The use of database of small size is used to measure database statistics for repeated access of DB cache. All the time components are linearly extrapolated from the measurement done at data of small size.

Data distribution in the database refers to a physical layout of the table rows in it and is used for defining the data distribution pattern. Data accessed through the non unique index scan query perceive different layouts of the rows. Further the data access for multiple key values is assumed to be sequential on key values. The data access pattern (or access pattern) follows a Uniform random (UR) distribution pattern and a Slotted Uniform Random (SUR) distribution pattern.

In UR access pattern, each row in the table has random value for foreign key within range from <min, max> of the corresponding primary key. The range <min, max> or distinct unique values (max-min) does not change with growth of the data size. Therefore, the number of qualified rows per key increases with data size. All rows having same key value for the index are randomly stored across all data blocks of the table. For example, in TPC-H benchmarks, supplier table has supp_nk as non-unique index on nation's primary key which has constant number of unique value with data size growth.

In SUR access pattern, each row in the table has a "distribution patterned" value for foreign key within range from <min, max> of the corresponding primary key. The distribution pattern of key value in this case, is sequentially dividing the table into as many slots as number of blocks having rows qualifying a key value such that each slot will have at least one row for a given key value. The range <min, max> or distinct unique values increases with growth of the data size. Therefore, the number of qualified rows per key and hence number of slots remains constant with data size. For example, in TPC-H benchmarks, partsupp table has partsupp_sk non-unique index on supplier's primary key for which distinct values uniformly increases with increase in data size.

Data access pattern refers to the order of key values of corresponding index which are used to qualify the relevant data (rows). Different form of data access for non unique index scan query are described below:

1. Fast Index Access—In this type of access all leaf nodes are accessed sequentially.

2. Range Access—In this type of access, rows satisfying key values lying in a range are accessed. For example, 10<s_nationkey<20. In one type of case, if all rows satisfying all key values are accessed based on sequential value of the key, then it is referred as Full Access. For example, s_nationkey>1. It is to be observed that index blocks and data blocks may have repeated access—once for each matching key value.

The determination module 214 is configured to use the database statistics, i.e., data distribution pattern inside the database and the data access pattern to determine one or more cache miss factors associated with the execution of the query type (non unique index scan query). The one or more cache miss factors comprise of OS cache miss factor (or simply OS cache miss) and DB cache miss factors (or simply DB cache miss).

Database cache factors are calculated for multiple scenarios. Multiple scenarios include scenario of data base of large size and database of small size.

Scenario of data base of large size: For the database size larger than the DB cache, number of DB cache misses need to be predicted to calculate user and system time components. Similarly, for database size larger than OS cache, OS cache misses needs to be estimated to calculate system and IO time.

Steps involved while executing the query over the database of small size:

1. Fetch data by traversing the B tree reading root block, leaf block(s) and data block(s)
2. For a block, Check if the block is in DB cache, if it is there, read the data from DB cache
3. Otherwise, generate an OS read call (pread) request, to get the data block.
4. Copy the data block in the DB cache for future access and read the data from the DB cache for further processing Steps involved in OS read calls are described below:
1. For a block, Check if the block is in OS cache, if it is there, read the data from OS cache
2. Otherwise, generate a disk read call request, to get the data block and few more neighboring blocks as part of pre-fetching from hard disk.
3. Copy all the fetched data block in the OS cache and read the data from the OS cache to return to the database process.

Database size comprises of data blocks and index blocks. Effective cache size for data blocks (ECD) may be defined as size of cache available for data blocks since index blocks being relatively small are assumed to be in cache forever once placed in it.

Therefore, $$ECD=CB-IB,$$

where, CB (Cache Blocks)=Cache size/Block size and IB: number of Index Blocks

Determination module 214 is configured to use database statistics to determine cache miss factors for various data distribution pattern. Cases for UR distribution (UR distribution pattern) and SUR distribution (SUR distribution pattern) are explained further.

Scenario for UR distribution: In UR distribution, DKV is close to TotBlks in the table. System 102 assumes that any range query will eventually access all data blocks, i.e., any access of type (key>val) increases the total reads but physical reads are nearly constant with increase in value of val for a given size of database. As long as DKV<ECD and TotBlks<ECD, all accesses will be serviced through DB cache. A range access, key≤val, will have multiple rounds of sequential key values accesses, i.e., fetch all rows with key=1, key=2 . . . key=val in this sequence only. There are two following situations in this case, Case 1: DKV<ECD and TotBlks>ECD Case 2: DKV>ECD In case 1, a round of data block access for a key value will fit in the DB cache, however, in the subsequent rounds the data block may not be in the DB cache.

$$\text{Total DB Cache Miss}=DKV+(\text{MatchKeys}-1)\\*DKV*Prob(Miss/block/key)$$

$$Prob(Miss/block/key)=(TotBlks-DKV)/\\TotBlks*Prob(RowBlk)$$

$$Prob(RowBlk)=NRB*Prob(\text{key generated in the block})$$

$$Prob(\text{key generated in the block})=1/Maxval(\text{because key value is tandomly generated between 1 and Maxval})$$

$$\text{Total DB cache Miss}=DKV+(\text{Match Keys}-1)\times DKV\times\\(TotBlks-DKV)/TotBlks\times NRB\times 1/Maxval$$

For case 2, DKV>ECD, each access is effectively leading to DB cache miss, therefore, Total DB Cache Miss=Number of accesses; this may be obtained from database trace such as "tkprof" for small size database and may be linearly extrapolated to get Total DB cache miss for large database.

Scenario for SUR distribution: In SUR distribution pattern, number of slots is same as DKV which remains constant with increase in database size. However size of each slot increases with database size. As long as DKV<ECD and TotBlks<ECD, all accesses will be serviced through DB cache. A range access, key≤val, will have multiple rounds of sequential key values accesses, i.e., fetch all rows with key=1, key=2 . . . key=val in this sequence only. In this case, DKV<ECD always holds true since DKV remains constant with database size. So database cache miss will occur only if TotBlks>ECD.

$$\text{Total DB Cache Miss}=DKV+(\text{MatchKeys}-1)\\*DKV*Prob(Miss/slot/key)$$

$$Prob(Miss/slot/key)=SeqSegs*Prob(RowBlk)$$

$$Prob(RowBlk)=1/NRB$$

$$\text{Total DB Cache Miss}=DKV+(\text{MatchKeys}-1)\times DKV\times\\SeqSegs/NRB$$

In SUR distribution pattern, since DKV is constant, one block from every slot will always be in DB cache, however, miss will occur only when the access referencing the row does not occur in that block in that slot in the cache. This depends on the number of rows in the block as well as the data distribution pattern in the block. By way of an example, consider partsupp table in TPC-H benchmarks, where each block has four sequential segments of rows on partsuspp-.suppkey column, i.e., data is distributed with key values in sequence after gap of 4, i.e., 1,201,301,401,2,202,302, 402 . . . in sequence. An access will be in block if it is in any of these sequential segments.

The determination module 214 is configured to determine OS cache miss factors (or simply OS cache miss) by using the database statistics by using a blackbox approach. In black box approach, DB code is not used to get Cache miss factors (or cache misses). Database statistics are used as black box to calculate cache miss factors. For determining OS cache miss factor, cache miss due to first time of access of data blocks may be neglected as the misses due to first time of access will linearly increase with increase in database size. In order to calculate the OS cache miss factor, misses due to repeated access of the blocks and not showing linear behavior are important. A DB cache miss may get serviced from OS cache or hard disk.

OS cache miss factor determination for UR access pattern:

If TotalBlks<OS Cache size/block size, then all DB cache misses will be serviced from OS cache, which may have required block either due to pre-fetching or repeated access. Otherwise, OS cache miss will be reported for each data block access because of sequential access of data for each key value, which will force to read from underlying storage subsystem (hard disk).

Total OS Cache Miss=Number of accesses, which could be linearly extrapolated from the measurements on small size DB.

OS cache miss factor determination for SUR distribution pattern: In this case, since DKV<ECD, and data block for each key for each slot is randomly distributed among blocks in a slot, therefore, OS cache misses could be linearly extrapolated.

Cache plays a vital role while predicting query elapsed response time. The system 102 further observes by using tools like 'strace' that query execution process spends 99% of the time in OS read calls, which is the largest contributor to query elapsed response time. Read calls refer to read index and data blocks in the database.

Once all the cache miss factors for UR distribution pattern and SUR distribution pattern are determined, the calculation module 216 calculates one or more time components associated with the processing of the query inside the database.

The query elapsed response time has two broad components Central Processing Unit (CPU) time and Input-Output (IO) time. The IO time may be contributed from physical disk access IO or from OS cache IO. The CPU time may be further divided as a user time and a system time. The user time corresponds to time spent by query execution process in user domain. Also, time spent in fetching data from DB cache may be included in user time. The system time corresponds to time spent by the query execution process in executing system calls which includes OS reads returning from the OS cache. Therefore, the one or more time components comprises of the user time, the system time and the IO time.

The calculation module 216 is configured to calculate one or more time components associated with query processing inside the database. The one or more time components are calculated by using the cache miss factors, i.e., DB cache miss factor and OS cache miss factor for multiple distribution patterns and access patterns. The query elapsed time may be predicted by using the user time, the system time and the IO time. The user time and the system time takes into account the effect of database cache and the OS cache respectively.

A query execution time in user domain may comprise of time spent by operators, DB cache access time and network time to send data to query client. Table 2 lists all notations used for explaining the determination cache miss factors.

| Variable Name | Meaning |
| --- | --- |
| DBcacheAccessTime | Time spent by DB in user domain for every DB cache miss |
| NDA | Number of data accesses |
| GenSysReadTime | Time spent by query process in generating and processings System Read Call for DB miss |
| NDR | Number of disk reads |

The user time could be linearly extrapolated with size of database until Total DB cache misses increases non-linearly which leads to extra time spent in user domain to generate extra system read calls. Therefore, Usertime=UserTime linearly extrapolated+ExtraUserTime Further, the time taken by a query process in user space while servicing the data block request is:

UserTime=NDA*[Check in DB cache+Read from DB Cache]+Total DB Miss*[Generate Pread+Copy data in DB Cache]

UserTime=NDA*DBCacheAccessTime+Total DB Cache Miss*GenSysReadTime    (1B)

If all the requests are serviced by DB cache, then Total DB Miss=0 and hence,

UserTime=NDA*DBCacheAccessTime    (2B)

Therefore, DBCacheAccessTime=Usertime/NDA
ExtrauserTime=GenSysReadTime
GenSysReadTime={UserTime(1)−UserTime(2)}/Total DB Cache Miss, where UserTime(1) and UserTime(2) are UserTime from equation 1B and 2B respectively. The UserTime for both equations may be calculated using system profiling tools such procstat.

Calculation module 216 performs following steps in order to calculate ExtraUsertime:
On small database of size less than DB cache size
1. Flush OS cache. Flush DB cache. Run test query such as "select/*+index (supplier supp_nk)*/sum(s_acctbal) from supplier where s_nationkey>=0".
2. Take measurements of utime1, systime1 and iotime1 using procstat. All the accesses will be done from hard disk only.
3. Flush DB Cache. Run query again. Take measurements of utime2, systime2 and iotime2. DB cache misses, which will be number of physical reads (PR) from DB traces, will be serviced from OS cache.
4. Run query again. Take measurements of utime3, systime3 and iotime3. All read requests are serviced from DB cache only. The (utime3−utime2) shall measure the time taken by PR reads to generate system read calls.

ExtrauserTime=GenSysReadTime=(utime3−utime2)/PR.

DBCacheAccessTime=utime3/NDA

The calculation module 216 is further configured to calculate system time. The system time is linearly extrapolated unless DB cache miss happens. A DB cache miss leads to access of OS cache which gets attributed to the query system time. Systime=SysTime linearly extrapolated+ExtraSysTime Further, SysTime=Total DB Cache Miss*[Check in OS cache+Read from OS cache]+NDR*[Generate Disk read call+copy data in OS cache]

When all data blocks are in OS cache, NDR=0 and therefore could be used to calculate ExtraSysTime. System 102 assumes and verifies that 99% kernel time is spent in processing system read calls. Then OS cache access per OS read may be calculated as:

SysTime=Number of OS reads*OS Cache AccessTime

Therefore, OS Cache AccessTime=SystemTime/Number of OSreads.

The calculation module 216 is further configured to calculate extra Systime for database size greater than DB cache size. Following steps are performed by the calculation module 216 to calculate extra Systime:
1. Flush OS cache. Flush DB cache. Run a test query using index scan. Take measurements of utime1, systime1 and iotime1 using procstat.
2. Flush buffer cache. Run query. Take measurements of utime2, systime2 and iotime2. Measure the Physical reads (PR) using DB trace "tkprof"
3. systime2 shall measure the time taken by PR reads, since these reads are serviced by OS cache and counted in kernel time.
4. OS cache access Time=(systime2)/PR.

The calculation module 216 is further configured to calculate extra Systime for database size greater than OS cache size. Following steps are performed by the calculation module to calculate extra Systime:
1. Flush OS cache. Flush DB cache. Run a test query using index scan, which can generate large number of disk reads such as "Select/*+index(partsupp pkpartsupp)*/sum(ps_availqty) from partsupp;". Take measurements of utime1, systime1 and iotime1 Measure the Hard Disk reads using (HR) using iostat. System 102 assumes that each disk read request is of DB block size.

2. Flush DB cache. Run the test query. Take measurements of utime2, systime2 and iotime2.
3. systime2-systime1 shall measure the time taken by kernel to generate HR disk reads.
4. Time per Disk read generation=(systime2−systime1)/HR.

The calculation module 216 is further configured to calculate disk access time. IO time measured from a sufficiently large database size is linearly extrapolated as long as disk reads are linearly extrapolated. When the database size is larger than OS cache size, then number of OS reads is actual disk reads. Otherwise, disk reads are less than OS reads which may be calculated using system monitoring tools such 'iostat' for small database execution and can be linearly extrapolated for larger data size.

After all the time components are calculated, the prediction module 218 predicts the query elapsed response time by using the one or more time components. The query elapsed response time is obtained by adding the user time, the system time and the disk access time. Depending of the data distribution and given data size, following possibilities may occur: Table Size<DB Cache Size, DB Cache Size<Table Size<OS cache size, Table Size>OS cache size Table Size<DB Cache Size: In this case, the user time and system time are linearly extrapolated. First, measure user time, sys time and IO time for small database of size say "S" using "procstat" in linux. The user time and sys time are linearly extrapolated for all sizes less than "S". For predicting query ERT on size small than "S", the data blocks pattern may be generated, played and the IO time may be obtained. Since for small data size, OS cache has a major role to play, therefore actual number of disk reads may not be in proportion to increase in data size. The time measured by playing the data block pattern includes both disk access time and OS cache access time. However, after a certain size, when physical reads are significantly high, the hard disk reads are proportional and therefore, IO time may be linearly extrapolated.

DB Cache Size<Table Size<OS cache size:

For SUR distribution pattern: The increase in number of system reads generated by query process does not exhibit linear behaviour. In fact, all reads generated by the query process leads to OS cache reads. The actual hard disk reads corresponds to only first time read of all table data blocks and leaf blocks; any subsequent repeated block reads are serviced from the OS cache. Therefore, user time and system time is non-linearly extrapolated by factor of increase in system reads.

For SUR distribution pattern: The number of slots (data blocks per key value) remains invariant to increase in data size. Therefore, actual hard disk reads are at least equal to number of slots. The subsequent system reads (which are same as DB Cache Misses as calculated before) may be serviced from hard disk or OS cache (due to OS pre-fetching feature). These misses lead to extra user time and extra system time.

Table Size>OS cache size

SUR distribution pattern query ERT prediction follows the same pattern as explained above. In UR distribution pattern, the DB cache misses leads to OS Cache misses as well. So physical reads generated by the query process actually lead to hard disk reads. The user time is linearly extrapolated from the size of DB as that of DB Cache size. The system time is non-linearly extrapolated from the measurements of size "S" with extra system time contributed towards generation of these extra disks read. The number of hard disk reads is linearly extrapolated from the small size "S" multiplied by the number of unique keys. (Because, for each key value, the whole table is read, since the OS cache is smaller than table file size, for each such key, whole table will be read from hard disk only. This is an approximation made by system 102 and actual number may be little less than this.) The disk access time is calculated as number of hard disk reads multiplied by time per hard disk read calculated from measurements taken at size "S".

Therefore, the Query ERT (elapsed response time) or the query elapsed response time:

$$\text{Query ERT} = \text{User time} + \text{System Time} + \text{Disk Access Time}$$

where, the User Time, the System Time and the Disk Access Time are the time components associated with the processing of the query inside the database.

By ways of a non limiting exemplary embodiment, a DB server Oracle 11 g is used to predict effect of cache on query elapsed response time, quad core server with 4 GB RAM connected to fibre channel SAN with 1 TB storage for purpose of experiments performed by the system 102. The database schema and data may be generated using open source dbgen utility based on TPC-H benchmarks.

The system 102 formulates three synthetic queries on supplier, customer and partsupp tables, presented in Table 5, based on our query classification classified by the classification module 212. The database consists of table supplier with index supp_nk, on field s_nationkey, table customer with index cust_nk on field c_nationkey and partsupp with index partsupp_suppkey on ps_suppkey. A small database of size 1 G created and all queries defined in Table 5 are executed on the database.

TABLE 5

Query1(UR): select /*+ index (supplier supp_nk) */ sum(s_acctbal) from supplier where s_nationkey>0;
Query2(UR): select /*+ index (customer cust_nk) */ sum(c_acctbal) from customer where c_nationkey>0;
Query3(SUR): select /*+ index(partsupp partsupp_suppkey) */ sum(ps_availqty) from partsupp where ps_suppkey>0;

By way of non limiting exemplary embodiments, it is further observed by the system 102 that the DB cache misses for query 1 on database size of starting from 512 GB, query 2 on database size starting from 32 GB and query 3 on database size starting from 4 GB.

Consider customer table of TPC-H benchmark having UR data distribution pattern. For 16 GB database, customer table has DKV=44340, TotalBlks=54981, ECD=52350

Prob(Miss/block/key)=(10641/54981)*43*1/25=0.33288

Total DB Cache Miss=44340+24*44340*0.33288=398586, while actual number of misses reported are 408261, i.e., deviation with 2.36% error For 32 GB database, customer table size has DKV=89561, ECD=52350, ECD<DKV, Total DB Cache Miss is same as total accesses linearly extrapolated.

Consider partsupp table of TPC-H benchmark having SUR data distribution pattern. For 4 GB database, partsupp table has DKV=80, Cache Size=53728, SS=4, NRB=48, Maxval=80000

Prob(Miss/slot/key)=4/48

Total DB Cache Miss=80+79999*80*4/48=533406, while actual misses reported are=530968, i.e., deviation with 0.4% error.

Figure 4:
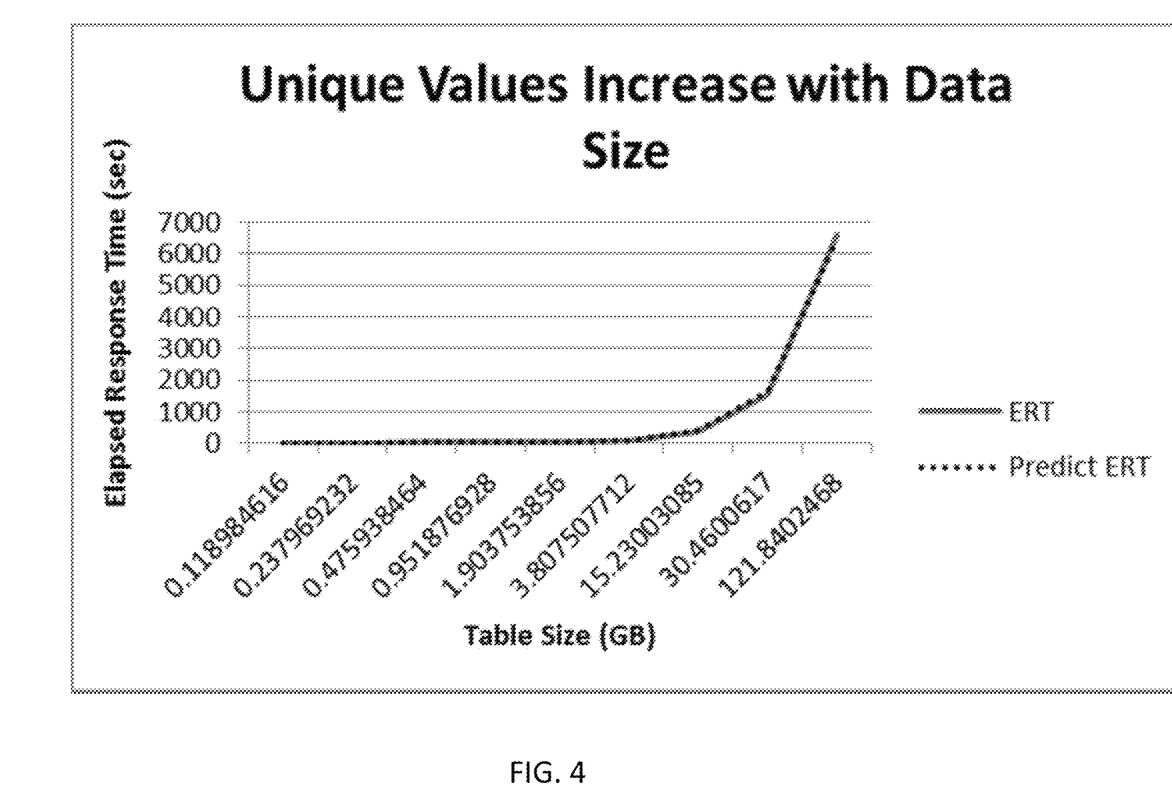
FIG. 4 illustrates analytical details about Query Elapsed Response Time (ERT) for one type of query (Q1), in accordance with an exemplary embodiment of the present subject matter.
Figure 5:
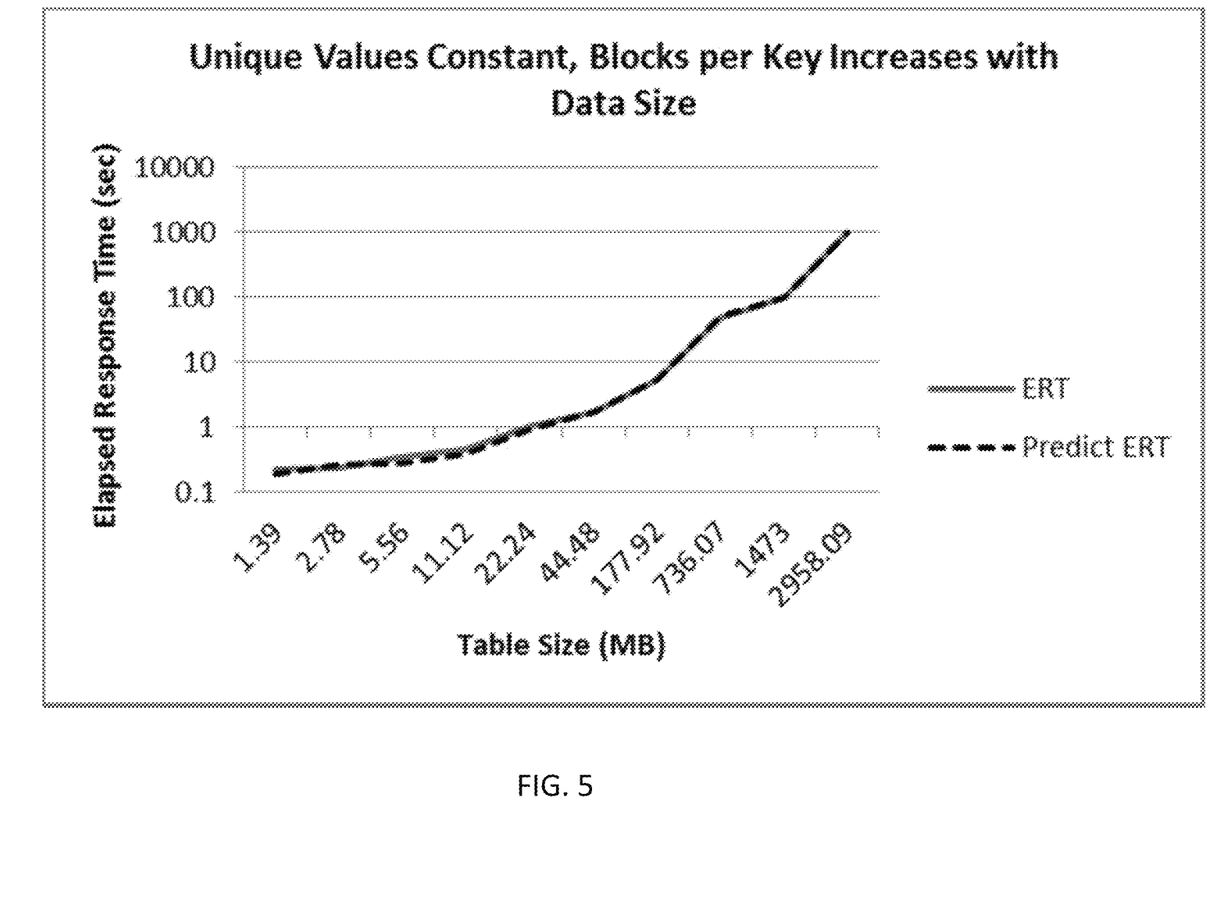
FIG. 5 illustrates analytical details about Query Elapsed Response Time (ERT) for a second type of query (Q2), in accordance with exemplary embodiment of the present subject matter.
Figure 6:
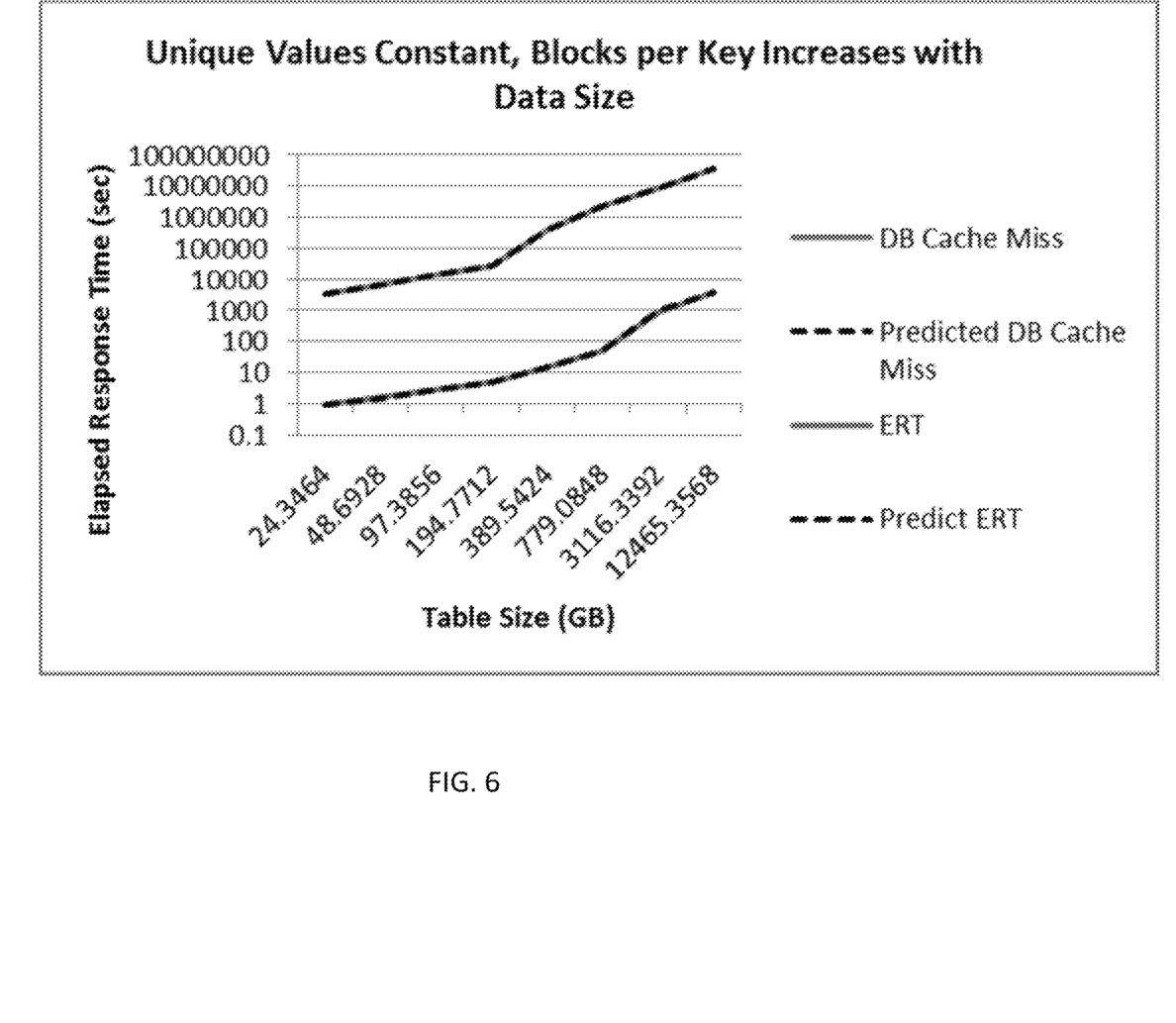
FIG. 6 illustrates analytical details about Query Elapsed Response Time (ERT) for a third type of query (Q3), in accordance with an exemplary embodiment of the present subject matter.

By way of another non-limiting exemplary embodiment, the Elapsed Response Time (ERT) comparisons results for queries 1, 2 and 3 are presented in FIGS. 4, 5 and 6 respectively. It is further observed that for Q1 and Q2 which has UR data distribution, the system 102 is able to predict ERT close to that of actuals. FIG. 4 shows DB cache misses prediction versus actual DB cache miss reported by the database (these are noted using "tkprof" utility of oracle 11 g).

In FIGS. 4, 5 and 6, it is further observed that higher error rate at low size which may be attributed to measurement anomaly and may decrease by averaging of multiple measurements of the query for the same instance.

Figure 7:
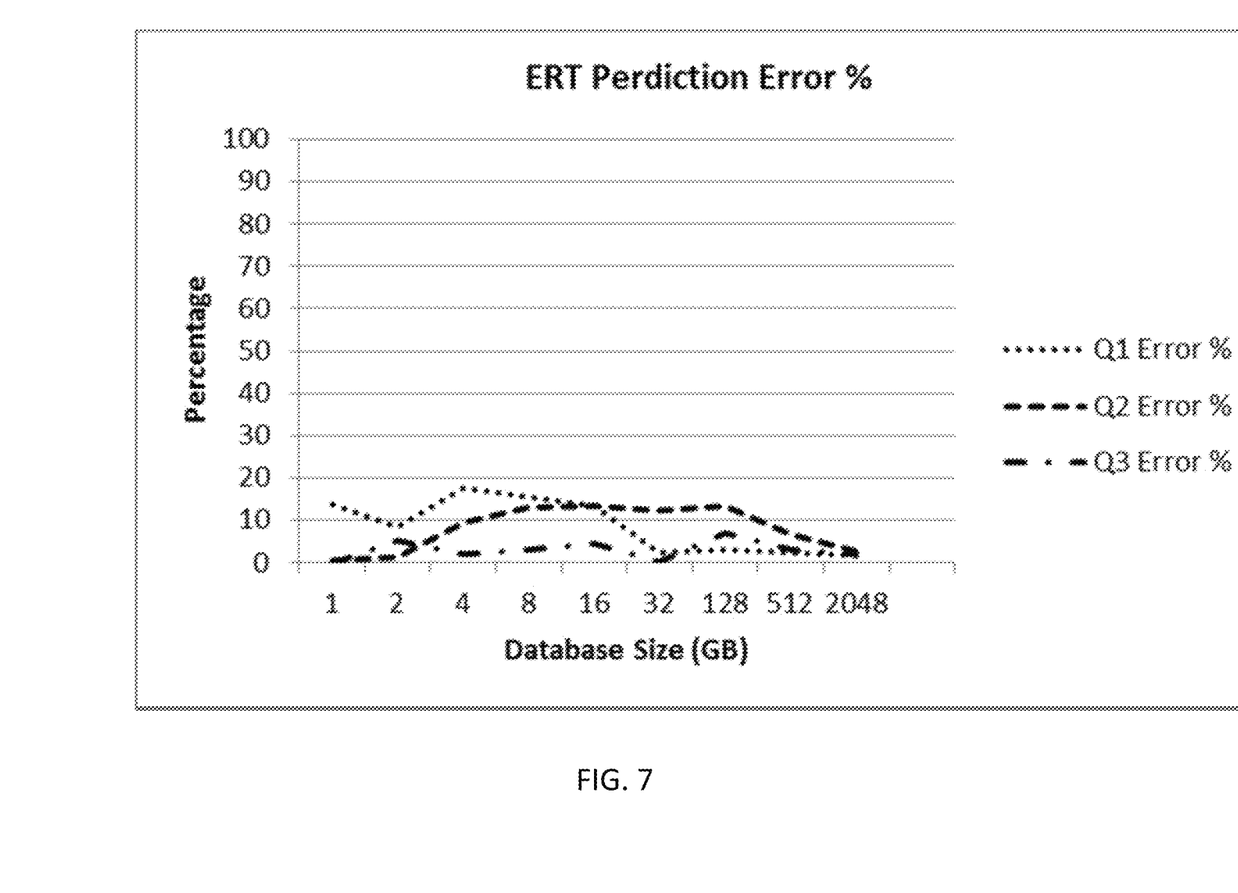
FIG. 7 illustrates Elapsed Response Time prediction error percentage for queries, in accordance with an exemplary embodiment of the present subject matter.

FIG. 7 depicts the error percentage in ERT prediction by the system 102. It is also observed that for all queries the error rate is below 10% and seems to be converging to 2%.

Figure 3:
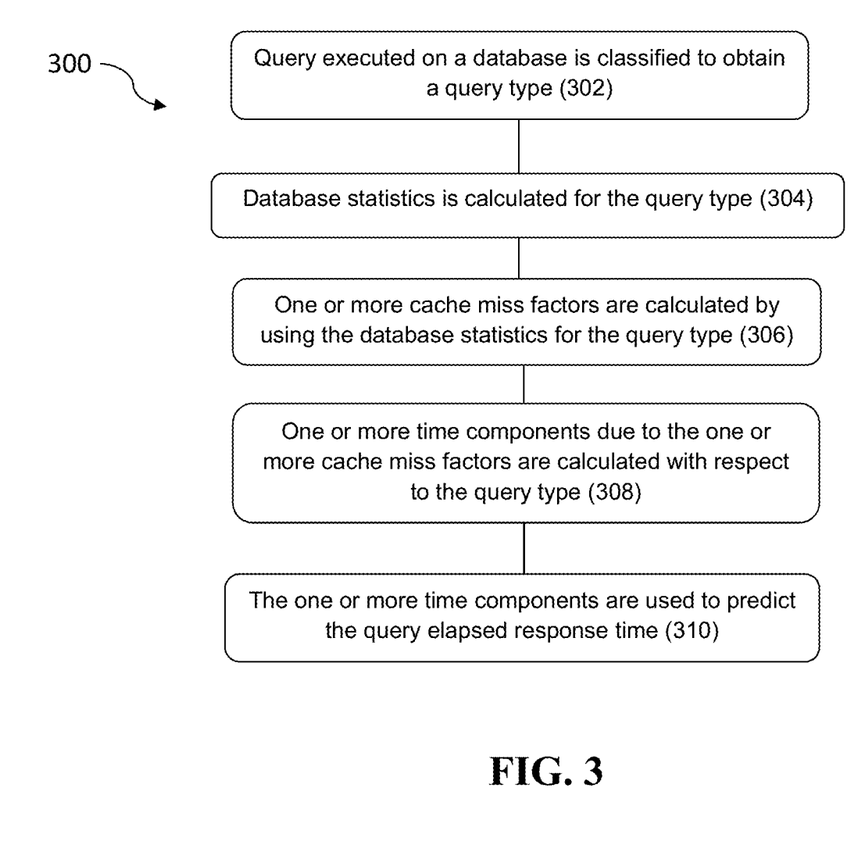
FIG. 3 illustrates a method predicting effect of cache on query elapsed response time during an application development stage, in accordance with an embodiment of the present subject matter.

Referring to FIG. 3, the order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, query is classified to obtain a query type.

At block 304, database statistics is collected with respect to the query type.

At block 306, one or more cache miss factors are determined for the query type.

At block 308, one or more time related values are calculated with respect to the one or more cache miss factors.

At block 310, the cache miss factors are used to predict the query elapsed response time.

The written description describes the subject matter herein to enable any person skilled in the art to make and use the embodiments of the invention. The scope of the subject matter embodiments are defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A system implemented on a server predicting effect of cache on query elapsed response time during an application development stage, the system comprising:
    a processor; and
    a memory coupled to the processor, wherein the processor executes a plurality of modules stored in the memory, and wherein the plurality of modules comprise:
        a classification module to classify a query executed on a database to obtain a query type, wherein the query is classified based on a database access pattern of the query along with one or more keys associated with the query, wherein the key refers to one or more columns referred to in the query, wherein behavior of a cache access by the query depends on a data distribution pattern and a data access pattern that determines an order of key values used to access data and qualify relevant data in the database, and repeated data accesses are served from one of an operating system (OS) cache, and a database (DB) cache depending on the data access pattern and data distribution pattern in a table present in the database;
        a determination module to:
        collect one or more database statistics with respect to the query type, wherein the database statistics refer to the data distribution pattern and the data access pattern of the query; and
        determine one or more cache miss factors by using the database statistics, wherein the one or more cache miss factors predicts number of access of the cache by the query not found in the database cache, and wherein the one or more cache miss factors are determined by using a Blackbox approach, wherein a database cache miss is serviced from one of the OS cache or a hard disk, and wherein the determination module further:
            determines a Database Cache miss factor for Uniform Random (UR) access pattern and Database Cache miss factor for a Slotted Uniform Random (SUR) pattern, wherein all rows having a same key value for an index are randomly stored across all data blocks of the table in the UR access pattern; and
            determines an Operating System (OS) cache miss factor for Uniform Random (UR) access pattern, wherein the data distribution pattern of a key value in the SUR pattern sequentially divides the table into as many slots as a number of blocks having rows qualifying the key value such that each slot has at least one row for the key value;
        a calculation module to calculate one or more time components associated with processing of the query in the database with respect to the one or more cache miss factors; and
        a prediction module to predict the query elapsed response time by using the one or more time components for a varying size of the database,
        wherein the one or more time components comprises a Central Processing Unit (CPU) time and an Input-Output (IO) time associated with the processing of the query, wherein the CPU time includes a user time and a system time,
        wherein, for a database size larger than the database cache, the database cache miss is predicted to calculate the user time and the system time, and
        wherein, for a database size larger than the OS cache, the OS cache miss is estimated to calculate the system time and the IO time.

2. The system of claim 1, wherein the query comprises a non-unique index scan query, wherein the non-unique index scan query has repeated access to data blocks present in the database.

3. The system of claim 1, wherein the data distribution refers to a physical layout of the table rows in the database.

4. The system of claim 1, wherein the data access pattern follows a Uniform Random (UR) distribution pattern and a Slotted Uniform Random (SUR) distribution pattern.

5. The system of claim 1, wherein the user time comprises time spent by operators, DB cache access time, and network time required in sending data to a user with respect to the query.

6. The system of claim 1, wherein the calculation module extrapolates the one or more time components based on the database statistics.

7. The system of claim 1, wherein the prediction module adds the one or more time components to predict the query elapsed response time.

8. A method predicting an effect of cache on query elapsed response time during an application development stage, the method comprising:

classifying a query executed on a database to obtain a query type, wherein the query is classified based on a database access pattern of the query along with one or more keys associated with the query, wherein the key refers to one or more columns referred to in the query, wherein behavior of a cache access by the query depends on a data distribution pattern and a data access pattern that determines an order of key values used to access data and qualify relevant data in the database, and repeated data accesses are served from one of an operating system (OS) cache, and a database (DB) cache depending on the data access pattern and data distribution pattern in a table present in the database;

collecting one or more database statistics with respect to the query type, wherein the database statistics refer to the at least one data distribution pattern in the database and at least one data access pattern of the query collected inside the database; and determining one or more cache miss factors by using the database statistics, wherein the one or more cache miss factors predicts number of access of the cache by the query not found in the database cache, wherein a database cache miss is serviced from one of the OS cache or a hard disk, and wherein the determining of one or more cache miss factors further comprises:

determining a Database Cache miss factor for Uniform Random (UR) access pattern and Database Cache miss factor for Slotted Uniform Random (SUR) pattern, wherein all rows having a same key value for an index are randomly stored across all data blocks of the table in the UR access pattern; and determining an Operating System (OS) cache miss factor for Uniform Random (UR) access pattern, wherein the data distribution pattern of a key value in the SUR pattern sequentially divides the table into as many slots as a number of blocks having rows qualifying the key value such that each slot has at least one row for the key value;

calculating one or more time components associated with processing of the query in the database with respect to the one or more cache miss factors; and predicting the query elapsed response time by using the one or more time components for varying size of the database, wherein the one or more time components comprises a Central Processing Unit (CPU) time and an Input-Output (IO) time associated with the processing of the query, wherein the CPU time includes a user time and a system time, wherein, for a database size larger than the database cache, the database cache miss is predicted to calculate the user time and the system time, and wherein, for a database size larger than the OS cache, the OS cache miss is estimated to calculate the system time and the IO time.

9. A non-transitory computer readable medium having embodied thereon a computer program for predicting effect of cache on query elapsed response time during an application development stage, the method comprising:

classifying a query executed on a database to obtain a query type, wherein the query is classified based on a database access pattern of the query along with one or more keys associated with the query, wherein behavior of a cache access by the query depends on a data distribution pattern and a data access pattern that determines an order of key values used to access data and qualify relevant data in the database, and repeated data accesses are served from one of an operating system (OS) cache, and a database (DB) cache depending on the data access pattern and data distribution pattern in a table present in the database;

collecting one or more database statistics with respect to the query type, wherein the database statistics refer to the data distribution pattern in the database and the data access pattern of the query collected inside the database;

determining one or more cache miss factors by using the database statistics, wherein the one or more cache miss factors predicts number of access of the cache by the query not found in the database cache, wherein a database cache miss is serviced from one of the OS cache or a hard disk, and wherein the determining of one or more cache miss factors further comprises:

determining a Database Cache miss factor for Uniform Random (UR) access pattern and Database Cache miss factor for Slotted Uniform Random (SUR) pattern, wherein all rows having a same key value for an index are randomly stored across all data blocks of the table in the UR access pattern; and determining an Operating System (OS) cache miss factor for Uniform Random (UR) access pattern, wherein the data distribution pattern of a key value in the SUR pattern sequentially divides the table into as many slots as a number of blocks having rows qualifying the key value such that each slot has at least one row for the key value;

calculating one or more time components associated with processing of the query in the database with respect to the one or more cache miss factors; and predicting the query elapsed response time by using the one or more time components for varying size of the database, wherein the one or more time components comprises a Central Processing Unit (CPU) time and an Input-Output (IO) time associated with the processing of the query, wherein the CPU time includes a user time and a system time, wherein, for a database size larger than the database cache, the database cache miss is predicted to calculate the user time and the system time, and wherein, for a database size larger than the OS cache, the OS cache miss is estimated to calculate the system time and the IO time.

* * * * *